Figure 1:
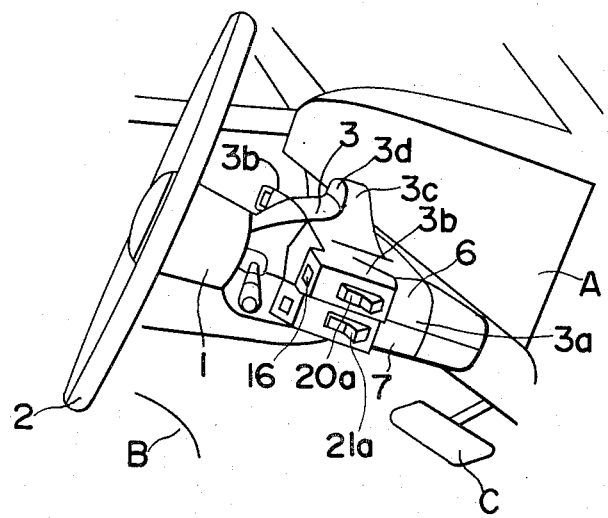

United States Patent [19]
Kobayashi et al.

[11] 3,857,454
[45] Dec. 31, 1974

[54] SWITCHES MOUNTING MEANS FOR USE IN A MOTOR-VEHICLE

[75] Inventors: Hirotsugi Kobayashi, Nagoya; Takehiko Nishikawa, Inazawa; Shinya Ito; Yasuhiko Ibuka, both of Aichi, all of Japan

[73] Assignee: Kabushiki Kaisha Tokai Rika Denki Seisakusho, Nishikasugai-gun, Aichi-ken, Japan

[22] Filed: Mar. 2, 1973

[21] Appl. No.: 337,368

[30] Foreign Application Priority Data
Mar. 3, 1972 Japan.................... 47-26268

[52] U.S. Cl. .................................. 180/78
[51] Int. Cl............................. B60k 27/00
[58] Field of Search.......... 180/78; 280/87 R; 200/61.54–61.57

[56] References Cited
UNITED STATES PATENTS
1,161,389 11/1915 Joy................................. 180/78 X
3,216,521 11/1965 Ulrich............................ 180/78
3,312,123 4/1967 Rumpf........................... 280/87 R FOREIGN PATENTS OR APPLICATIONS
611,716 10/1960 Italy.............................. 180/78
1,326,538 3/1962 France......................... 180/78
1,128,302 10/1958 Germany...................... 180/78

Primary Examiner—David Schonberg
Assistant Examiner—Jack D. Rubenstein
Attorney, Agent, or Firm—Craig & Antonelli

[57] ABSTRACT

In a motor-vehicle a means of mounting various switches for the control of different motor-vehicle elements wherein said switches are mounted on or near the extremities of portions of a columnar housing mounted around a motor-vehicle steering column, said extremities of said columnar housing portions being immediately behind a motor-vehicle steering wheel, whereby necessary switches can be operated by a driver of a motor-vehicle quickly and with a minimum of movement.

7 Claims, 6 Drawing Figures

3,857,454

SWITCHES MOUNTING MEANS FOR USE IN A MOTOR-VEHICLE

The present invention relates to a means for mounting switches in a motor-vehicle, and, more particularly, in an automobile, truck, or similar vehicle, to a means of mounting various switches for the control of different motor-vehicle elements in such a position and manner that a driver of the motor-vehicle has easy access thereto and can operate them comfortably without moving his body.

The majority of switches provided to control various elements or mechanisms in a motor-vehicle are switches which are required to be operated by a driver while driving, for example, direction indicator, dimmer, or headlight switches. It is known conventionally to provide certain of these switches immediately adjacent to a steering wheel. But such conventional means have the disadvantages that the closeness of switches can lead to mistakes in operation, and also that there is a low limit to the number of switches that can be thus provided in easy access for a driver, and so, conventionally, most switches which are required to be operated during the driving of a vehicle are provided on the dashboard. In order to operate switches provided on a dashboard it is necessary for a driver to change posture slightly, which, since such switches must be operated many times, can be fatiguing on a long journey; also, the use of safety belts restricts to some extent the movement of a driver and for this reason also it is desirable to provide the various control switches in a motor-vehicle in such a manner and in such a location that a driver can easily approach thereto and operate them comfortably.

It is accordingly an object of the present invention to provide in a motor-vehicle an improved means whereby necessary switches can be operated by a driver of a motor-vehicle quickly and with a minimum of movement of his body.

It is another object of the present invention to provide in a motor-vehicle a method and means of mounting various switches for the control of different motor-vehicle elements wherein said switches are mounted on or near the extremities of portions of a columnar housing mounted around a motor-vehicle steering column, whereby a driver can easily approach thereto and operate them comfortably without moving his body.

In accomplishing this and other objects there is provided according to the present invention a motor-vehicle steering column housing which permits free rotation of the steering column and which adjacent to and behind ghe steering wheel forms upper and lower, and left and right wing sections at the ends of which are provided switches for the control of various elements or mechanisms necessary for the driving of the vehicle.

Figure 2:
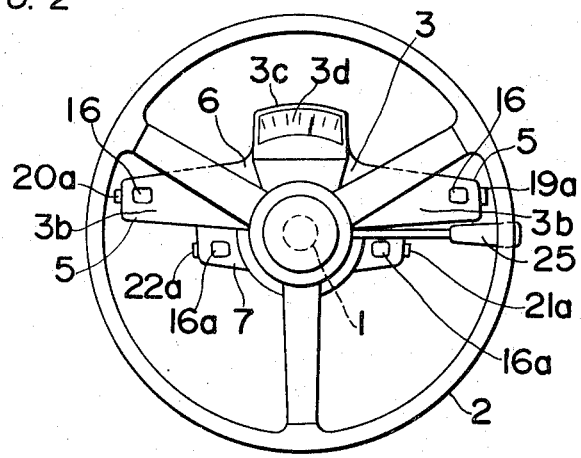
Figure 3:
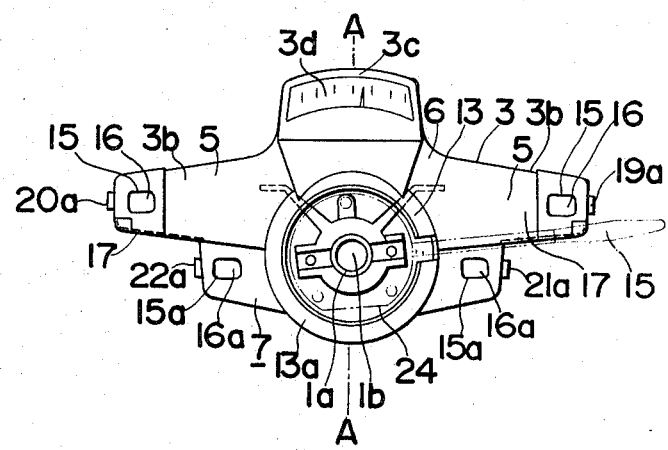
Figure 4:
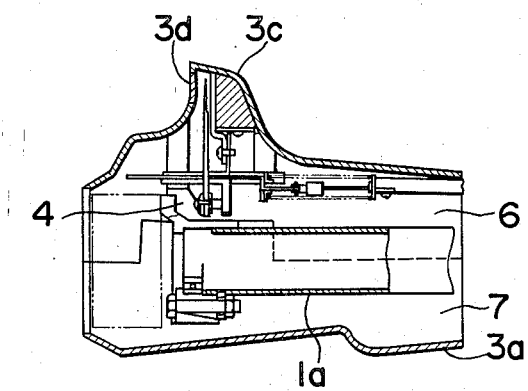
Figure 5:
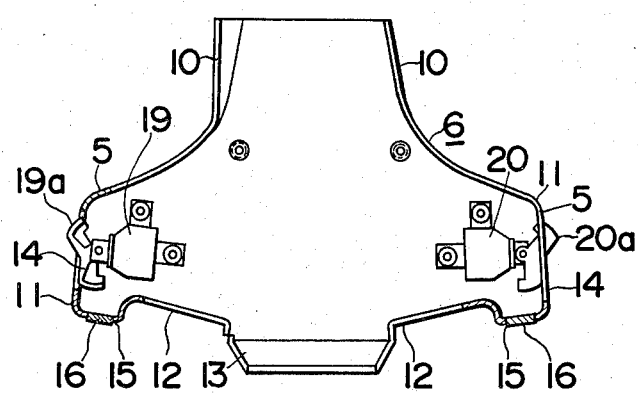
Figure 6:
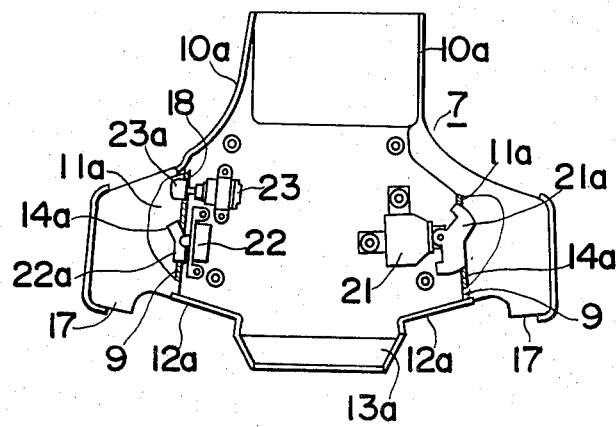

These and other objects and features of the present invention will become apparent from the following description made by way of example with reference to the attached drawings in which;

FIG. 1 is a partially perspective view showing a portion of a driving room in a motor-vehicle provided with a switches mounting means according to one preferred embodiment of the present invention, FIG. 2 is a front view of a steering wheel employed in FIG. 1, FIG. 3 is a front view of a columnar housing mounted around the steering column of the steering wheel of FIG. 2 and showing on an enlarged scale, FIG. 4 is a longitudinal sectional view of the columnar housing taken along the line of A—A in FIG. 3, FIG. 5 is an exploded inside view of the housing upper portion of FIG. 4, and FIG. 6 is an exploded inside view, partially broken away, of the housing lower portion of FIG. 4.

Referring first to FIG. 1, in a driving room of a motor-vehicle, there are provided a steering wheel 2 of a steering column 1 under a dashboard A and in front of a driver's seat B, the steering wheel 2 being fixedly attached to the extremity of the steering column 1, and driving pedals C below the dash-board A. Around the steering column 1 and behind the steering wheel 2 (that is, behind the steering wheel 2 as seen from the driver's seat B) there is mounted a protective columnar housing 3, within which the steering column jacket 1a having the rotary steering column shaft 1b is fixedly supported, and which is composed of an upper section 6 and a lower section 7, exploded inside views of which are shown in FIGS. 5 and 6, respectively.

The columnar housing 3 mounted to the lower portion of the vehicle dashboard A has a main cylindrical portion 3a, lateral extension portions 3b at the steering wheel end of the housing 3, and, between the two lateral portions 3b, a broad protrusion 3c which has a width that is approximately equal to the diameter of the main cylindrical portion 3a. In profile, the protrusion 3c rises steeply at the front, that is the side of the protrusion 3c facing the steering wheel 2, and slopes down less steeply at the back to join the main cylindrical portion 3a. At the top of the front of the protrusion 3c there is a window opening 3d, within which there is provided in indication dial with an indicator needle which indicates the dial markings representative of different gear-shift lever position, for example, P, N, R, 1, 2, 3; in otherwords seen from the driver'seat B the window opening 3d and dial are directly above the steering column 1 and behind the driving wheel 2. Extending in front of and behind the window opening 3d, and on both sides thereof there are provided fixture pillars 4, one end of which is fixedly attached to the inner surface of the protrusion 12 while the other end of which extends vertically downwards therefrom, and is fixedly attached to the outer surface of the steering column jacket 1a rotatably mounted on the steering column shaft 1b.

As shown in FIG. 5, the upper section 6 of the housing 3, seen from the front, that is from the driver's seat B, presents the appearance of two horizontal wing sections 5, which lie behind and extend symmetrically to the left and right of the steering column 1, and each of which is slightly less in length than the radius of the steering wheel 2, in other words the left and right extremities and of the upper portion 6 lie just within the circle formed by the steering wheel 2. The lower section 7, also, seen from the front, forms as shown in FIG. 6 horizontal two wing sections 9, which are also symmetrically disposed to the left and right of the steering column 1 and lie beneath and adjoining to the upper wing sections 5 and which are approximately half the length of the upper wing sections 5. Seen from below, as shown in FIG. 5, the housing upper section 6 forms a front surface 12 in the centre of which there is an opening protrusion 13, and at the ends of which there are smaller square projections 15; in continuation to and at approximately at right angles to the front surface 12 and projections 15 at both ends of the upper section 6 there are formed flat ends 11 which are the lateral surfaces of the wing sections 5, and towards the back (that is away from the driving wheel 2), the upper section 6 narrows and slopes evenly to the housing main cylindrical poriton 3a, which forms a continuation thereof.

The ower section 7 is also provided with flat cover plates 17 which extend along the front surface 12a from the ends to the points reached on the upper section 6 by the ends of the lower section 7. Seen from below, as shown in FIG. 6, the lower section 7 forms a front 12a in the centre of which there is an opening protrusion 13a; at the ends of the lower section 7 and at approximately right-angles to the front 12a there are formed flat ends 11a, which are lateral surfaces of the wing sections 9; from the flat ends 11a towards the back, the lower section 7 slopes evenly to meet the main cylindrical portion 3a. In profile, that is seen from the left or right of the driver's seat B, the housing 3 presents a broad section at the sections 6, 7 which tapers down towards the main cylindrical portion 3a.

Both the sections 6, 7 are coupled with each other and fixedly mounted on the steering column jacket 1a by a conventional means such as a bolt and nut to form the housing 3 as a cylindrical container, within which the steering olumn jacket 1a is covered.

In assembling of the housing 3, outer side edges 10 and 10a, 12 and 12a, 13 and 13a of both the sections 6, 7 meet together and the under portions of the ends of the upper section 6 are covered by the flat cover plates 17 of the lower section 7. Also, the steering column 1 passes through the upper and lower section 6 and 7 of the housing 3 through the portion thereof where the central protrusions 13, 13a of their respective fronts 12, 12a meet; and also around the protrusions 13, 13a there is positioned a direction indicator 24, which is bracket-connected to the upper section 6, and the control lever 25 for which is provided in connection therewith and positioned between the steering wheel 2 and the front surfaces 12, 12a of the upper and lower sections 6, 7.

Openings are formed in the projections 15 at the ends of the front of the upper section 6 and within these openings there are positioned transparent indicator plate 16. In each flat side end 11 of the upper section 6 there is formed an opening 14, and a two- or three-position rocker switch is positioned in each opening 14, a headlight control switch 19 in one opening 14 with its operating portion 19a slightly projecting therefrom to permit operation of the switch 19 and a windshield wiper switch 20 in the other opening 14 with its operating portion 20a slightly projecting therefrom.

Openings 15a are formed in the front at the ends of the lower section 7, and within these openings 15a there are placed transparent indicator plates 16a. In each flat side end of the lower section 7 there s formed an opening 14a, and immediately behind the opening 14a at one end 11a there is formed a hole 18. A two-position rocker switch 21 is positioned in one opening 14a with its operating portion 21a projecting slightly therefrom to permit operation of the switch 21, and a two-position rocker switch 22 is positioned in the other opening 14a with its operating portion 22a slightly projecting therefrom; the switch 21 is warning signal flasher switch, and the switch 22 is a parking light switch. In the hole 18 there is mounted a windshield washer switch 23 with the push-button 23a for operation thereof projecting slightly from the hole 18.

Accordingly, there is provided according to the present invention a motor-vehicle steering column housing which permits free rotation of the steering column and which adjacent to and behind the steering wheel forms upper and lower, and left and right wing sections at the ends of which are provided switches for the control of various elements or mechanisms necessary for the driving of the vehicle, whereby said switches are mounted on or near the extremities of portions of a columnar housing mounted around a motor-vehicle steering column behind the motor-vehicle steering wheel.

As is clear from the above explanation, in the means of the present invention switches controlling various lights or other elements in a motor-vehicle and required to be operated during driving of a motor-vehicle are provided immediately behind a steering-wheel. The invention therefore offers the advantages that operation of these switches is much quicker and more convenient than that of switches provided on a dashboard and does not require a driver to search for the switches or to take his attention from the road in order to find the switches, and also that, the switches being provided in a columnar housing around a steering column, compared with switches mounted on a dashboard, mounting checking and reapair thereof is much easier.

Although the present invention has been fully described by way of example, it is to be noted that various changes and modifications are apparent to those skilled in the art. For example, although the present invention has been described as carried out to the columnar housing of cylindrical shape, it can be equally applicable to those of any shape. In this case, it is, of course, necessary to mount switches at positions immediately behind a steering wheel where are easy to operate them. Therefore, those changes and modifications should be, unless otherwise departing from the scope of the present invention, construed as included therein.

What is claimed is:

1. An apparatus for mounting various switches controlling different mechanisms in a motor-vehicle comprising:

a housing mounted around a motor-vehicle steering column, said housing having a plurality of different extremity portions, and said housing including first and second sections, said first and second sections being connected together to form said housing, wherein each of said first and second sections of said housing are provided with at least one of said plurality of different extremity portions of said housing, and a plurality of switch means for controlling various motor-vehicle mechanisms, at least one of said plurality of switch means being disposed at a respective one of each of said plurality of different extremity portions, each of said plurality of switch means including a switch and a transparent indicator panel, wherein each of said first and second sections of said housing include oppositely extending first and second wing members, each of said first and second wing members having a flat end part, each said flat end part forming said respective one of said plurality of different extremity portions of said housing.

2. An apparatus according to claim 1, wherein one said switch of each of said plurality of switch means is disposed at said flat end part of each of said first and second wing members.

3. An apparatus according to claim 2, wherein two said switches are disposed at one of said flat end parts.

4. An apparatus according to claim 3, wherein one of said two switches is a two-position rocker switch and the other of said two switches is a push-button switch.

5. An apparatus according to claim 2, wherein said first and second sections are top and bottom sections respectively, said top and bottom sections being connected together about said motor-vehicle steering column to form a columnar housing.

6. An apparatus according to claim 5, wherein said oppositely extending first and second wing members of respective top and bottom sections extend horizontally approximately parallel to the plane of the motor-vehicle steering wheel.

7. An apparatus according to claim 2, wherein said one switch of each of said plurality of switch means is a two-position rocker switch.

* * * * *